Figure 1:
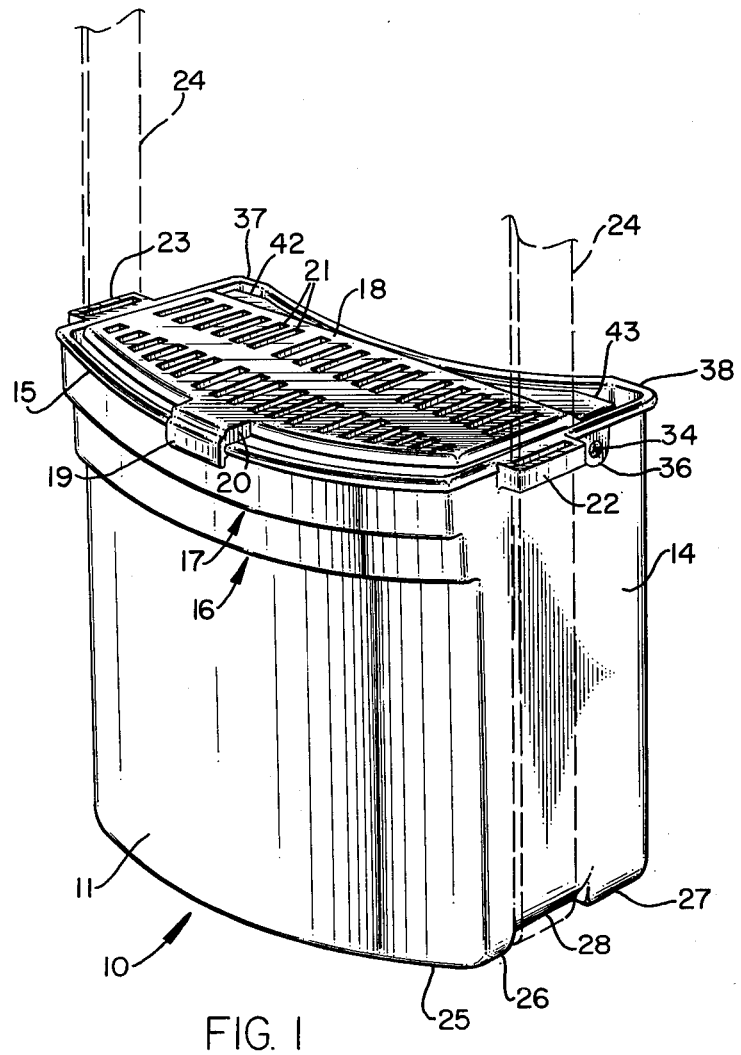

United States Patent

Lightfoot

[11] 4,054,005
[45] Oct. 18, 1977

[54] LIVE-BAIT PACK

[76] Inventor: Andrew O. Lightfoot, 2848 Bonnywood, Dallas, Tex. 75233

[21] Appl. No.: 703,808

[22] Filed: July 9, 1976

[51] Int. Cl.² ............................................. A01K 97/04
[52] U.S. Cl. ....................................... 43/55; 224/5 G
[58] Field of Search ............................. 43/55; 224/5 G

[56] References Cited

U.S. PATENT DOCUMENTS

| 514,542 | 2/1894 | Carter | 43/55 X |
|---|---|---|---|
| 1,076,542 | 10/1913 | Balch, Jr. | 43/55 |
| 1,354,660 | 10/1920 | Kanthack | 43/55 |
| 2,538,576 | 1/1951 | Mavrakis | 224/5 G |

Primary Examiner—Russell R. Kinsey
Assistant Examiner—Daniel J. Leach
Attorney, Agent, or Firm—Warren H. Kintzinger

[57] ABSTRACT

A portable live-bait pack, including a molded unitary body member and a molded unitary lid member. The body member is formed with arcuately contoured front and back walls shaped to conform to the body of a wearer. The upper extreme of the body front wall is formed with one or more outwardly stepped wall portions. Base portions of the wall steps are formed with a plurality of through-slots to provide container front wall aeration. The lid is offset-pivot mounted to the container body to minimize interference with a wearer's clothing, and formed with through-slots to facilitate top aeration.

9 Claims, 6 Drawing Figures

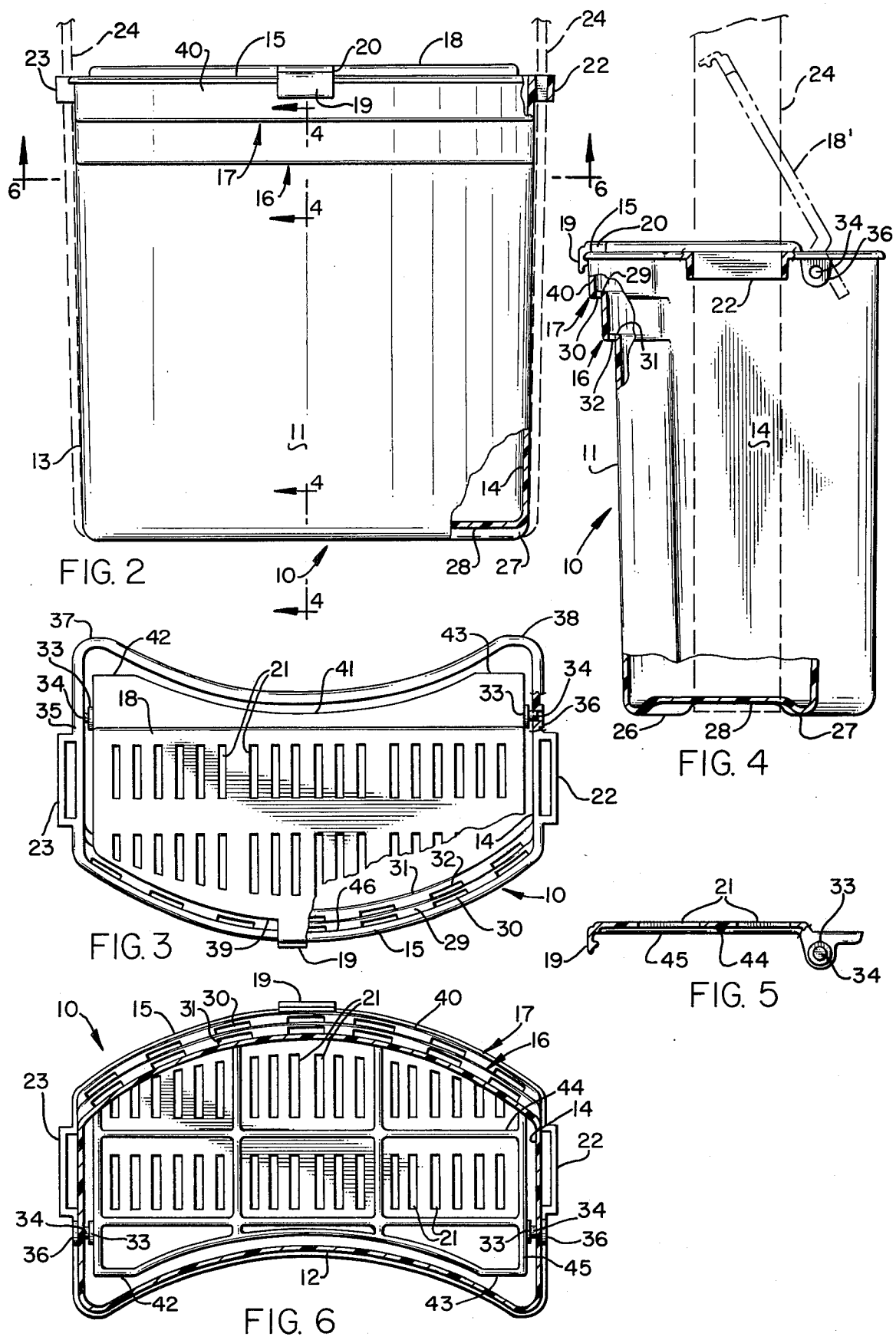

LIVE-BAIT PACK

This invention relates in general to live-bait containers used by fishermen, and in particular, to a portable fishing bait transporting water container to be carried by a fisherman at hip or waist level, in place of a conventional bait box or minnow bucket.

The conventional minnow bucket has long been employed by fishermen to keep live-bait, i.e., minnows, frogs and other water inhabiting bait. While minnow buckets are available in numerous designs, they are not primarily "protable" in the sense that they may be "worn" by the user. There accrodingly exists a need for a light-weight portable live bait container which can be shoulder-slung by a fisherman. Known live bait devices may not conveniently be used by a wading fisherman, for example, or by a person wishing to move along a shoreline while bait-casting.

It is, therefore, a principle object of this invention to provide a live bait, water containing, carrier pack which may be worn by the user by means of a shoulder strap.

Another object is to provide such a portable live-bait container which remains in a reasonably stable and comfortable position when carried by the user, and that leaves both hands free to operate rod and reel.

A further object for such a live-bait container is to provide ready, one-hand access to the bait containing confines of the container.

A still further object is to provide a light-weight container with both top and side oriented aeration means and a ready means for draining and refilling of water while being worn by the user.

Another object is to provide a portable, shoulder-strap carried container having a lid means which minimizes interference with the wearer's body and/or clothing during opening and closing.

Features of this invention useful in accomplishing the above objects, include, in a portable live-bait container, a unified plastic molded body member having arcuately contoured front and back walls shaped to conform to the body (for example the hip or waist) of the wearer. The upper extremes of the front (outside wall) of the container are arranged with one or more outwardly-stepped wall portions with the uppermost step terminating in the container upper lip. Horizontal portions of the front wall steps are formed with a plurality of space separated through-slots through which air may pass into the container confines, and through which water may either be taken into or drained from the container. A conforming top lid with pivot hinge means offset from the container rear wall edge provides for one-hand operation by the user without interference with the wearer's body or clothing, and is provided with through-slots for top aeration and a one-hand-operable snap-clasp locking means.

A specific embodiment representing what is presently regarded as the best mode of carrying out the invention is illustrated in the accompanying drawings.

In the drawings

FIG. 1, represents a front perspective view of the live bait container;

FIG. 2, a front elevation cut-away and sectioned view of the container;

FIG. 3, a top, partially cut away and sectioned view of the container;

FIG. 4, a side elevation, partial cut-away and sectioned view taken along the lines 4—4 of FIG. 2;

FIG. 5, a side elevation partial cut-away and sectioned view of the container lid; and, FIG. 6, a bottom view section taken along line 6-6 of FIG. 2.

Referring to the drawings:

The container of FIG. 1 is shown as a unitary body molding 10 having a convex outer front wall 11 and concave rear wall 12 adapted to conform to the body of a wearer. Paralleled side walls 13 and 14, and the front wall 11 are upper-edge terminated in an outwardly extending lip 15. Front wall member 11 is formed with outwardly extending steps 16 and 17, with upper step 17 being terminated in the container upper lip 15.

A hinged lid member 18, having a configuration which generally conforms to the top opening of container 10, is offset-pivot mounted to the container by means of pin and socket means which are offset from the rear wall side extremes of the container. A clasp-lock means 19 extends integrally from lid 18 and is distortable to effect a snap-lock engagement with the container upper wall lip 15, with the bottom 20 of the lock means 19 resting on the container upper lip 15.

As shown in FIG. 1, lid member 18 is formed with a plurality of through-slots 21 to facilitate container aeration. Container side walls 14 and 15 are formed with respective outwardly extending loop members 22 and 23 through which a shoulder strap 24 (depicted in phantom line) may be received. Bottom 25 of the container may be formed with respective downwardly extending front and rear extensions 26 and 27 to define a recess 28 within which strap 24 is received and edge-confined, while providing front and rear container bottom stand surfaces. As depicted in FIG. 2, shoulder strap 25 is carried through loop retainers 22 and 23, and through the recessed bottom channel. Cut-away and sectioned detail in FIG. 2 shows the container bottom and wall as a comparatively thin-walled plastic molding.

The top view of FIG. 3 illustrates the rear wall 12 and front wall 11 as being similarly curved, with rear wall 12 being shaped to conform to a wearer's body to lend comfort and stability. As depicted by the cut-away portions of FIG. 3 and FIG. 4, the bottom 29 of uppermost front-wall step 17 is provided with a plurality of through-slots 30 formed therethrough for permitting aeration through the front wall. Similarly, the bottom 31 of lower front-wall step 16 is provided with a plurality of through-slots 32 for aeration purposes. The lower cut-away portion of FIG. 4 depicts the recess 28 in the container bottom with extending front and rear faces 26 and 27 upon which the container may rest.

As shown in FIG. 3 and FIG. 4, lid member 18 is provided with integrally extended pivot pins 33 and 34 which form part of the lid molding, while the bodyof the container is formed with molded receiving sockets 35 and 36 located outwardly from the respective container rear wall edge extremes 37 and 38. Lid 18 is attached to the body by simple outward deformation of the container side walls to permit entry of the lid hinge pins into the respective socket holes, with the body of the container returning to its normal shape to firmly retain the lid hinge pins in the sockets.

As shown in FIG. 3, the lid 18 closes with the outer edge 39 thereof spaced from the front face 40 of the uppermost front wall step 17, with lid snap-lock extension 19 resting on the upper wall lip 15. The pivot line of action for lid 18 is such that the central point 41 of the concave rear edge of the lid remains essentially at a fixed point as the lid pivots during opening and closing. It is noted that this lid action minimizes interference with the wearer's clothing during lid opening and closing actions, since the lid does not hinge at the rear extreme of the container. Further, because the lid is pivoted about an action line away from the body-engaging rear wall of the container, the lid is less likely to be closed by body contact and less likely to be restricted by body contact during opening. Since the rear extremes 42 and 43 of the lid (those closest to the wearer's body) pivot into the container with lid openings, and pivot upwardly with lid closings, with lid rear extreme center point 41 being essentially motionless, the tendency for the wearer'clothing to become entangled in, and conflict with, lid operation is minimized.

As best depicted in FIGS. 5 and 6, the lid 18 is mold with a grid-like pattern of raised ribs 44 on the underside thereof to add structural rigidity. Ribs 44 are integral with an outer peripherally extending rib 45.

The live bait pack herein described is thus seen to incorporate distinct utilitarian features into a two-piece molded structure (container and lid) which are simply "snapped" together. Both lid and container may be readily molded, including the respective lid hinge counterparts thereof, as single unitary structures. While molded ribs lend structural rigidity to the lid member; the container member is provided with structural rigidity by the molded-in base extensions on front and back extremes, these base extensions further serving to provide a position-restrained recess for the carrying strap. The stepped upper extremes of the container outer wall add rigidity to the container, as well as providing several utilitarian bait-container features. The front wall, bottom-slotted steps provide side aeration while minimizing the sloshing of water in the container outwardly from the container wall, such as might be imparted by the wearer's motions. The slotted-steps, together with the slotted lid, increase aeration by permitting flow-through air flow. In addition, the slotted front wall step feature cooperates with the offset lid pivot feature to compensate for access and egress restrictions which might otherwise be imposed by the concave container rear wall and off-set pivoted lid. Further still, the front wall step feature described herein provides a purchase for the user's hand when snapping open and snapping closed the lid.

Whereas this invention is herein illustrated and described with respect to a particular embodiment thereof, it should be realized that various changes may be made without departing from essential contributions to the art made by the teachings hereof.

I claim:

1. A portable live-bait container comprising a unitary body member with arcuately formed, generally concentric, front face and back walls contiguous with side walls and a container base, said back wall being concavely extended between respective side walls to substantially conform to the body of a wearer, said front face wall being extended outwardly by plural steps at the upper extreme thereof with an upper-most step wall terminated in a container upper-edge extending lip, each said step comprising a step base having formed therein a plurality of through-slots each providing a fluid communication between container confines and the outside of said container; and container lid means pivotally mounted to said container body member.

2. The live-bait container of claim 1, with said lid means having a periphery generally conforming with the top opening of said container body member, with lid outside dimensions being less than the inside dimensions of said top opening; off-set hinge pivot means for pivotally mounting said lid means to said container, the pivot action line of said lid means being offset from the container body member back wall edge extremes; and lid latching means formed integrally with said lid means and extending from the lid means outer edge center to rest on said container body member upper lip with said lid means in a closed position.

3. The live-bait container of claim 2 with said lid means having a plurality of through-slots extending therethrough.

4. The live-bait container of claim 3 with said hinge pivot means comprising socket means formed integrally with said body member side walls, and hinge pin means formed integrally with, and extending outwardly from, the respective side extremes of said lid means.

5. The live-bait container of claim 4, with said pivot action line beingsubstantially coincident with the center point of the rear concave edge of said lid means.

6. The live-bait container of claim 5, with said lid latching means being formed with a turned-over outer edge extreme to conformingly engage with said container body member upper 1 top, edge and bottom surfaces.

7. The live-bait container of claim 6, with said container body member and lid means comprising respective unitary molded semi-rigid resilient plastic structures.

8. The live-bait container of claim 7, with said container body member side walls being formed with respective outwardly extending U-shaped strap receiving means; and the bottom of said body member being formed with a recessed channel extended between body member side walls; whereby a carrying strap may be received through said recessed channel and respective ones of said strap receiving means.

9. The live-bait container of claim 8, with the bottom of said lid means being formed with a grid-like pattern of rib extensions, the rib pattern extremes being contiguous with a continuously extending peripheral rib.

* * * * *